(12) United States Patent
Ito

(10) Patent No.: US 7,859,159 B2
(45) Date of Patent: Dec. 28, 2010

(54) ELECTRIC MOTOR

(75) Inventor: Yasuhide Ito, Toyokawa (JP)

(73) Assignee: Asmo Co., Ltd., Kosai-Shi, Shizuoka-Ken (JP)

( * ) Notice: Subject to any disclaimer, the term of this patent is extended or adjusted under 35 U.S.C. 154(b) by 0 days.

(21) Appl. No.: 12/414,906

(22) Filed: Mar. 31, 2009

(65) Prior Publication Data

US 2009/0243416 A1    Oct. 1, 2009

(30) Foreign Application Priority Data

Apr. 1, 2008  (JP) .............................. 2008-095164

(51) Int. Cl.
*H02K 33/00*  (2006.01)
(52) U.S. Cl. ................. 310/156.47; 310/12.26
(58) Field of Classification Search ............ 310/156.47, 310/12.26, 103, 104
See application file for complete search history.

(56) References Cited

U.S. PATENT DOCUMENTS 4,123,691 A * 10/1978 Seilly ..................... 318/119
5,715,504 A * 2/1998 Sahay ..................... 399/277
7,176,590 B2 * 2/2007 Fujimoto ................. 310/12.15

FOREIGN PATENT DOCUMENTS

| JP | 54-149806 | 11/1979 |
|---|---|---|
| JP | 60-210158 | 10/1985 |
| JP | 07-298596 | 11/1995 |

* cited by examiner

*Primary Examiner*—Dang D Le
(74) *Attorney, Agent, or Firm*—Pearl Cohen Zedek Latzer LLP

(57) ABSTRACT

An electric motor having a stator and a mover is disclosed. The stator has excitation coils of three phases, and the mover is movable relative to the stator. The mover has an opposed surface facing the excitation coils. Field poles or protrusions are provided on the opposite surface. The field poles or the protrusions extend helically about the axis of the mover. Each excitation coil extends helically in the same direction as the field pole or the protrusion about the axis of the mover so as to face the field pole or the protrusion.

5 Claims, 6 Drawing Sheets

ELECTRIC MOTOR

PRIOR APPLICATION DATA

This application claims benefit from prior Japanese application 2008-095164 filed Apr. 1, 2008, incorporated by reference herein in its entirety.

FIELD OF THE INVENTION

The present invention relates to an electric motor having a stator with excitation coils of three-phases.

BACKGROUND OF THE INVENTION

Japanese Laid-Open Patent Publication No. 7-298596 discloses a three-phase brushless motor. The motor of the above publication includes a cylindrical stator with a plurality of teeth. The teeth project radially inward from the inner circumferential surface of the stator and are arranged at equal intervals in the circumferential direction. A wire is wound about the teeth, so that coils of three-phases are formed. A rotor (mover), which is rotatable relative to the stator, is located radially inward of the stator. The rotor has permanent magnets that create field poles. The excitation coils of respective phases each receive an alternating-current of which the phase is displaced by 120° relative to the phases of the alternating-current power supplied to the coils of the other two phases. When the alternate-currents supplied to the excitation coils magnetizes the teeth to which the coils are attached, repelling and attracting forces are repeatedly generated between the teeth and the permanent magnets of the rotor. This in turn rotates the rotor.

Winding wires about teeth is burdensome. Particularly, in an electric motor having teeth projecting radially inward from the inner circumferential surface of the stator, the space between adjacent teeth narrows toward the radially inner ends. Thus, wires are difficult to wind about the teeth. This lowers the workability when the motor is manufactured.

SUMMARY

Accordingly, it is an objective of the present invention to provide an electric motor that allows excitation coils to be easily formed.

To achieve the foregoing objective and in accordance with one aspect of the present invention, an electric motor including a cylindrical stator and a mover is provided. The stator has excitation coils of three phases. The mover is movable relative to the stator. When electric currents are supplied to the excitation coils, the mover moves relative to the stator. The mover has an opposed surface facing the excitation coils. The opposed surface is provided with a field pole or a protrusion that helically extends about an axis of the mover. Each excitation coil extends helically in the same direction as the field pole or the protrusion about the axis of the mover so as to face the field pole or the protrusion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a preferred embodiment according to the present invention will be described.

Figure 1:
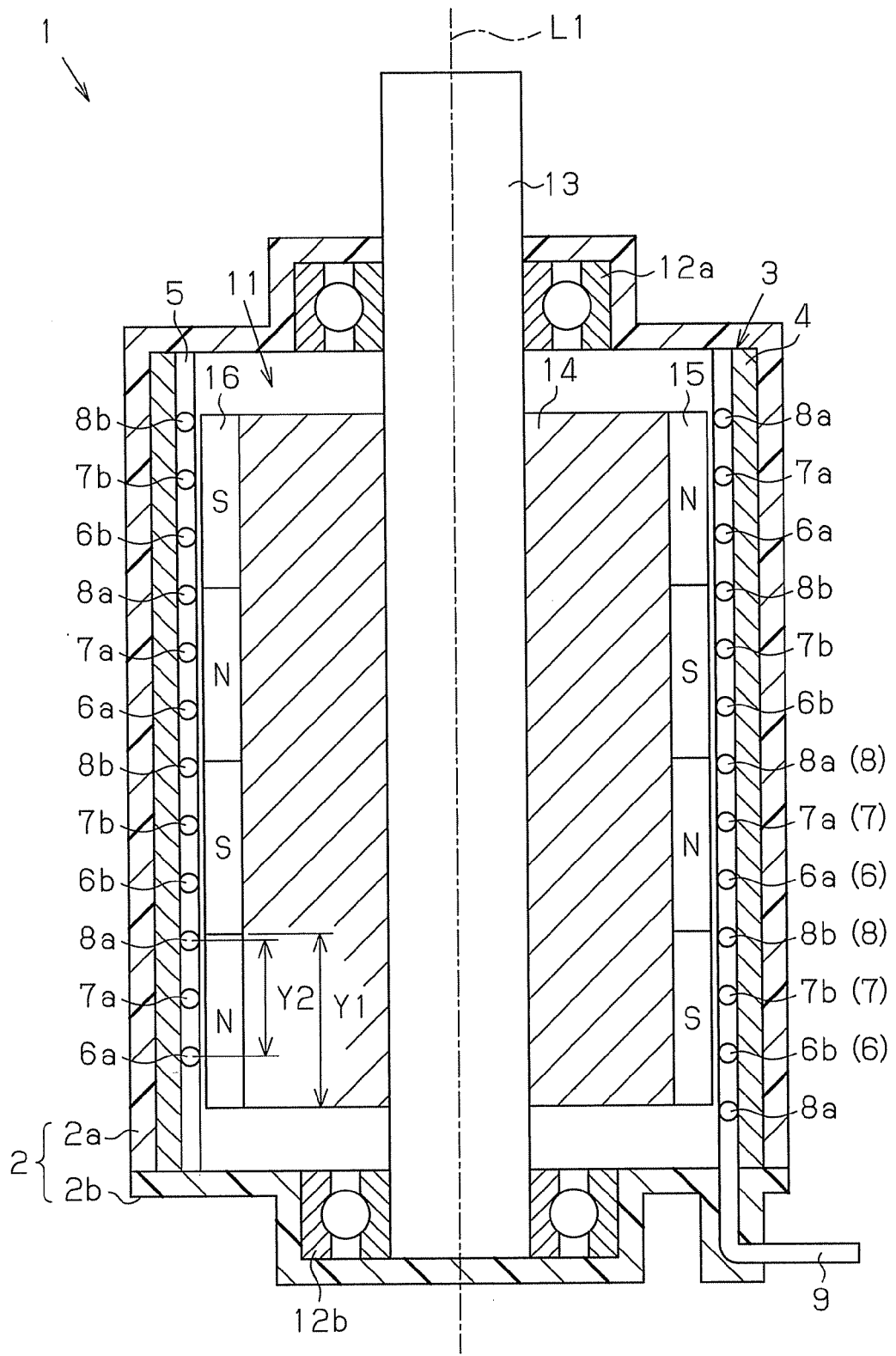
FIG. 1 is a cross-sectional view illustrating an electric motor according to one embodiment of the present invention.
Figure 2:
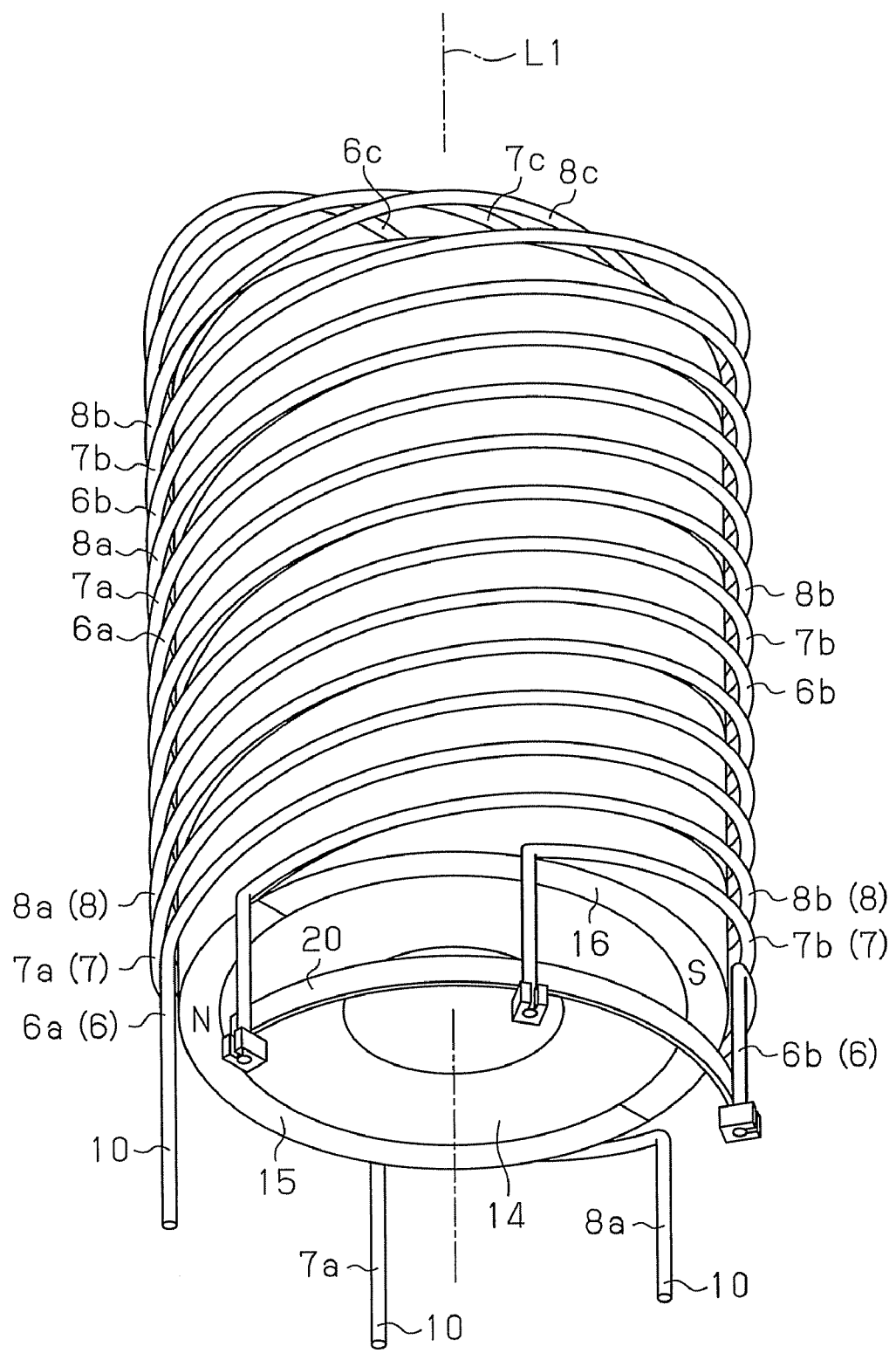
FIG. 2 is a perspective view illustrating a rotor and coils of the electric motor shown in FIG. 1.

As shown in FIGS. 1 and 2, a brushless motor 1, which is an electric motor, has a resin housing 2. The housing 2 includes a substantially cylindrical housing body 2a having a bottom, and an end frame 2b covering the opening of the housing body 2a. A stator 3 is fixed to the inner circumferential surface of the housing body 2a.

The stator 3 is made of metal and has a substantially cylindrical armature yoke 4, and excitation coils 6, 7, 8 of three phases (U-phase, V-phase, W-phase). The armature yoke 4 is fixed to the inner circumferential surface of the housing body 2a. The excitation coils 6, 7, 8 are fixed to a coil fixing member 5 made of resin. The coil fixing member 5 is fixed to the inner circumferential surface of the armature yoke 4 together with the excitation coils 6, 7, 8. The excitation coils 6, 7, 8 are supplied with drive currents of three different phases from feeding portions 9 provided in the end frame 2b. The phases of the currents are displaced by 120°. The U-phase, V-phase, and W-phase excitation coils 6, 7, and 8 are formed by helically winding about the axis of the stator 3 a plurality of wires 10 along the inner circumferential surface of the armature yoke 4. A rotor 11, which is a mover, is rotatably arranged radially inside of the stator 3.

The rotor 11 includes a rotary shaft 13, a substantially cylindrical rotor yoke 14 attached to the rotary shaft 13, and permanent magnets 15, 16, the number of which is two in the present embodiment. The rotary shaft 13 is rotatably supported by a pair of bearings 12a, 12b, which are arranged in a center of the bottom of the housing 2 and a radially center of the end frame 2b, respectively. The permanent magnets 15, 16 function as field poles and are fixed to the outer circumference (opposed surface) of the rotor yoke 14 so as to face the excitation coils 6, 7, 8. The bearings 12a, 12b and other components restrict movements of the rotary shaft 13 in the direction of an axis L1 and the radial direction of the rotary shaft 13, while permitting the rotary shaft 13 to rotate about the axis L1. The axis L1 of the rotary shaft 13 is aligned with the axis of the stator 3. The permanent magnet 15 has a north pole in a radially outside portion, and the permanent magnet 16 has a south pole in a radially outside portion. The permanent magnets 15, 16 extend helically about the axis L1 in the same direction and at the same inclination angle relative to the axis L1 as those of the excitation coils 6, 7, 8. The permanent magnets 15, 16 are each wrapped about the outer circumference of the rotor yoke 14 two times. The radial cross section of each of the permanent magnets 15, 16 is substantially circular. The combination of the permanent magnets 15, 16 forms a cylindrical shape. The surface area of the radially outer side of the permanent magnet 15 is substantially equal to the surface area of the radially outer side of the permanent magnet 16.

The positional relationship between the excitation coils 6, 7, 8 and the permanent magnets 15, 16 will now be described.

Figure 3:
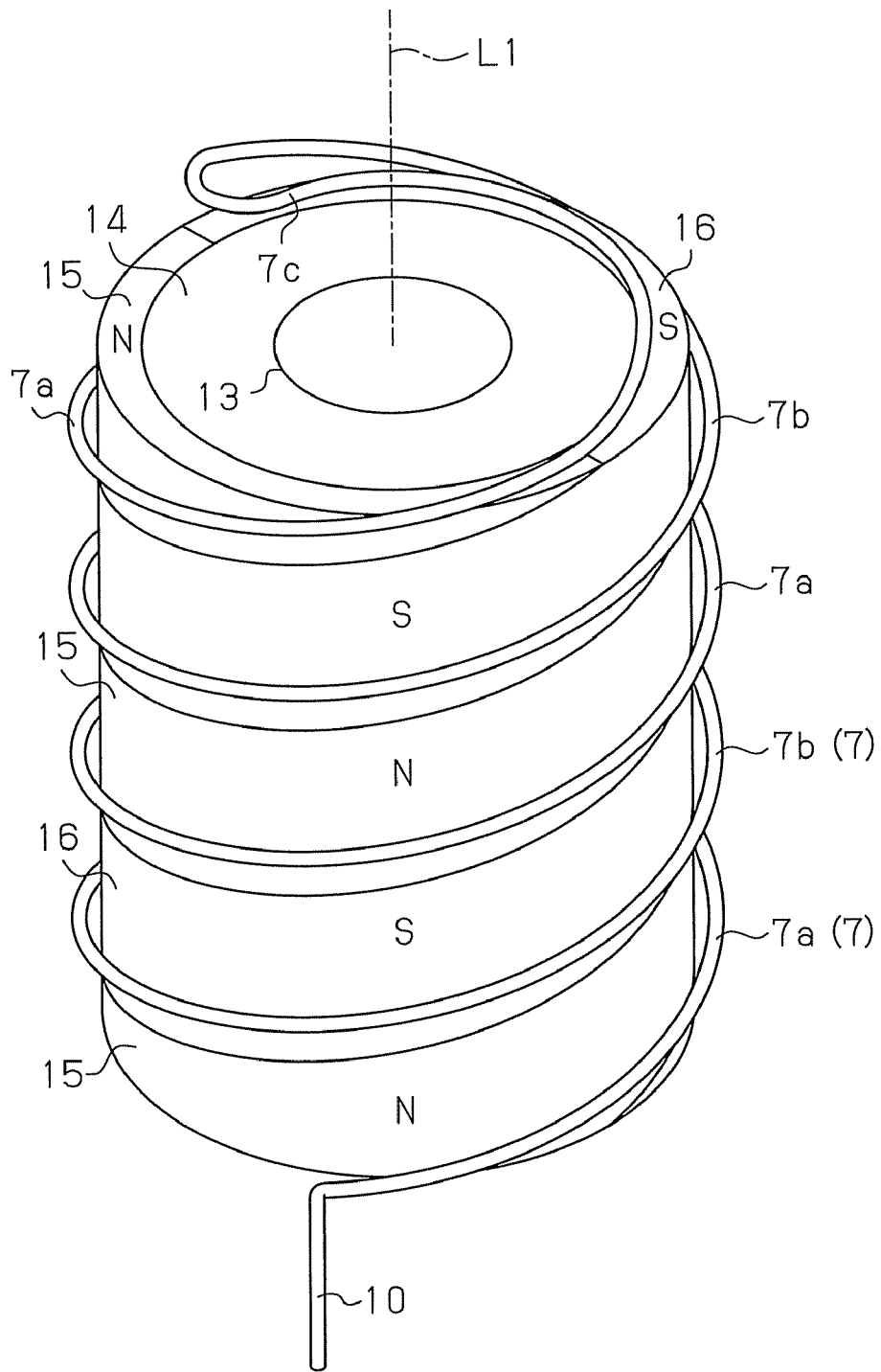
FIG. 3 is a perspective view illustrating the rotor and one of the coils of the electric motor shown in FIG. 1.

As shown in FIGS. 2 and 3 (only the V-phase excitation coil 7 is shown in FIG. 3), the U-phase, V-phase, and W-phase excitation coils 6, 7, 8 are each formed by a continuous single wire 10. The U-phase excitation coil 6 includes a first coil portion 6a, a second coil portion 6b, and a folded-back portion 6c. The V-phase excitation coil 7 includes a first coil portion 7a, a second coil portion 7b, and a folded-back portion 7c. The W-phase excitation coil 8 includes a first coil portion 8a, a second coil portion 8b, and a folded-back portion 8c.

Each of the first coil portions 6a, 7a, 8a has, in the vicinity of a first end (proximal end) of the stator 3 in the axial direction, an end connected to the corresponding one of the feeding portions 9 (lower portion as viewed in FIG. 2), and is helically wound on the inner circumferential surface of the armature yoke 4 from the first end toward a second end (distal end) of the stator 3. The first coil portions 6a, 7a, 8a all extend at the same inclination angle in relation to the axis L1. The folded-back portions 6c, 7c, 8c connected to the first coil portions 6a, 7a, 8a are located in the vicinity of the second end of the stator 3. At the folded-back portions 6c, 7c, 8c, the wires 10 are bent such that the winding direction of the second coil portions 6b, 7b, 8b is opposite to the winding direction of the first coil portions 6a, 7a, 8a, and that the wires 10 do not contact the rotary shaft 13. As shown in FIG. 3, at the folded-back portion 7c, the wire 10 is bent such that the second coil portion 7b extends from the second end to the first end of the stator 3 at the same inclination angle as the first coil portion 7a, and the second coil portion 7b is helically wound on the inner circumferential surface of the armature yoke 4.

Along the cross section of the stator 3 in the radial direction, the first coil portions 6a, 7a, 8a are displaced about the axis of the stator 3 by 60° relative to one another, and the second coil portions 6b, 7b, 8b are displaced about the axis of the stator 3 by 60° relative to one another. Also, along the cross section of the stator 3 in the radial direction, the first coil portion 6a and the second coil portion 6b are displaced from each other by 180°, the first coil portion 7a and the second coil portion 7b are displaced from each other by 180°, and the first coil portion 8a and the second coil portion 8b are displaced from each other by 180°. That is, the first coil portions 6a, 7a, 8a and the second coil portions 6b, 7b, 8b, which are helically wound at the same inclination angle, are arranged at equal intervals.

As shown in FIG. 1, in the axial direction of the motor 1, the width Y1 of the permanent magnets 15, 16 is slightly greater than the width Y2 of the group of the three first coil portions 6a, 7a, 8a or the group of the three second coil portions 6b, 7b, 8b. Therefore, when the first coil portions 6a, 7a, 8a correspond to the permanent magnet 15 of the north pole (first field pole), the second coil portions 6b, 7b, 8b correspond to the permanent magnet 16 of the south pole (second field pole). The second coil portions 6b to 8b are connected to a common short-circuit member 20 so that the excitation coils 6, 7, 8 form star-shaped wiring. The short-circuit member 20 functions as a neutral point. In the present embodiment, each of the excitation coils 6, 7, 8 is formed by a single wire 10, and each wire 10 extends once between the first end and the second end of the stator 3. However, each of the excitation coils 6, 7, 8 may be formed by two or more wires 10. Alternatively, folded-back portions may also be provided in the vicinity of the first end of the stator 3, so that the wires 10 extend two or more times between the first end and the second end of the stator 3.

Figure 4:
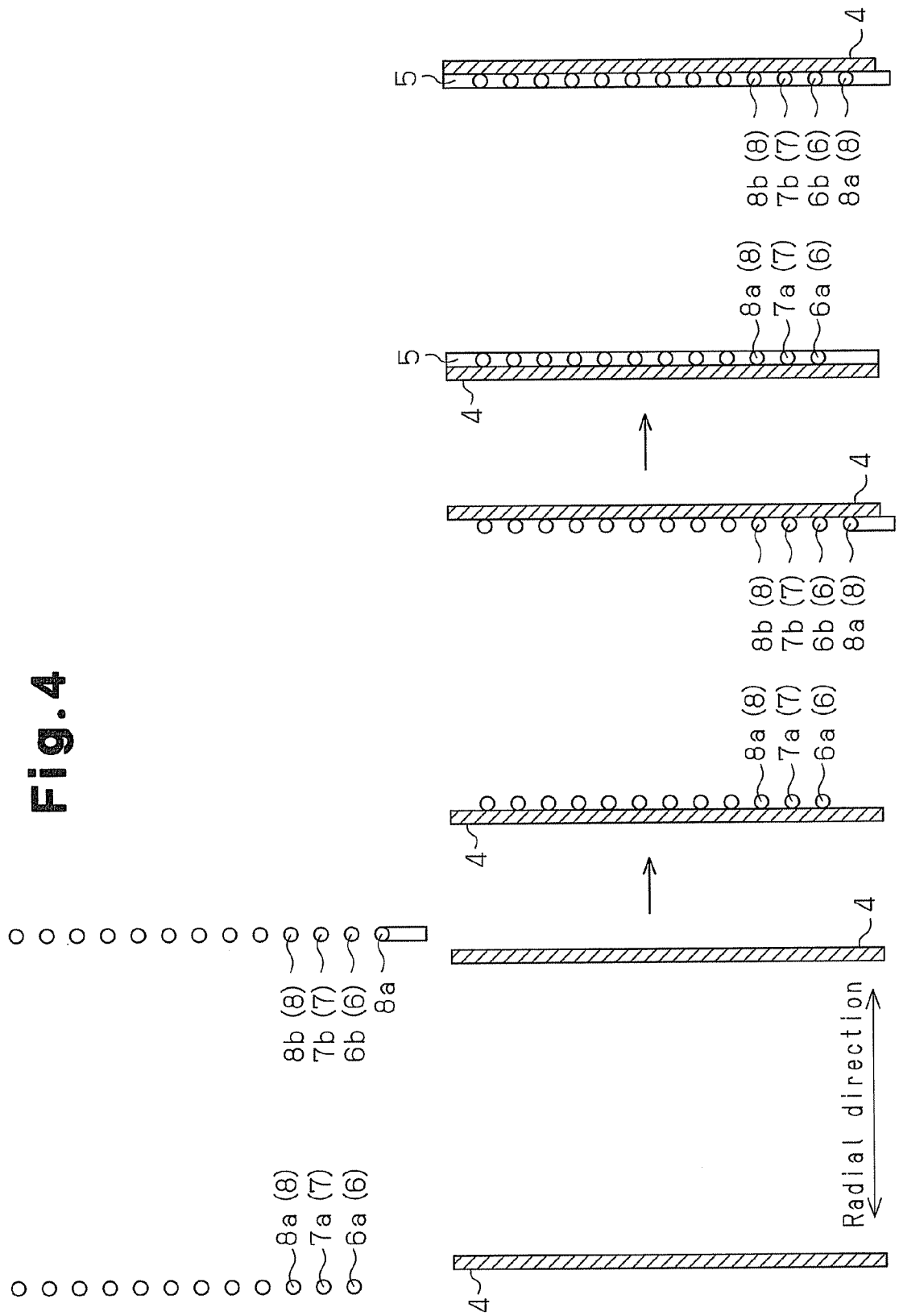
FIG. 4 is a diagram for explaining a method for arranging the coils in the electric motor shown in FIG. 1.

A method for manufacturing the stator 3 having the excitation coils 6, 7, 8 will now be described. As shown in FIG. 4, the excitation coils 6, 7, 8 are formed such that the outer diameter of the excitation coils 6, 7, 8 is greater than the inner diameter of the armature yoke 4. Thereafter, the excitation coils 6, 7, 8 are reduced in the diameters and inserted in the armature yoke 4. Then, the elastic restoring force of the excitation coils 6, 7, 8 presses the excitation coils 6, 7, 8 against the inner circumferential surface of the armature yoke 4. As a result, the excitation coils 6, 7, 8 are stably held on the inner circumferential surface of the armature yoke 4. Thereafter, the excitation coils 6, 7, 8 are fixed to the inner circumferential surface of the armature yoke 4 by the coil fixing member 5 made of resin.

The brushless motor 1 constructed as described above supplies the excitation coils 6, 7, 8 with three-phase drive currents, the phases of which are displaced by 120° relative to one another, from a power supply (not shown) via the feeding portions 9. Then, the attracting and repelling forces generated between the permanent magnets 15, 16 and the excitation coils 6, 7, 8 causes the rotor 11 (the rotary shaft 13) to rotate. Specifically, the magnetic field that is generated by supplying currents to the excitation coils 6, 7, 8 and the magnetic field of the permanent magnets 15, 16 produce torque that is perpendicular to the inclination angle of the permanent magnets 15, 16 on the outer circumferential portion of the rotor 11. Since the bearings 12a, 12b restrict movements of the rotor 11 in the radial and axial directions, the rotor 11 rotates about the axis L1. A position detecting sensor (not shown), such as a Hall IC, is provided at a position in the stator 3 that faces the permanent magnets 15, 16. The sensor detects the rotational position of the rotor 11 (the permanent magnets 15, 16). Based on the detected rotational position, the rotational speed and the rotation direction of the rotor 11 are controlled.

This present embodiment provides the following advantages.

(1) The rotor 11 has the permanent magnet 15, 16, which extend helically about the axis L1 of the rotor L1. On the inner circumferential surface of the stator 3, the helically extending excitation coils 6, 7, 8 are provided about the axis L1 to face the permanent magnets 15, 16. The excitation coils 6, 7, 8 extend helically in the same direction as the permanent magnets 15, 16. That is, the present embodiment provides the structure that is completely different from that of the brushless motor disclosed in Japanese Laid-Open Patent Publication No. 7-298596 cited in BACKGROUND OF THE INVENTION, in which wires are wound about a plurality of teeth projecting radially inward from the inner circumferential surface of a stator to form excitation coils. This facilitates the formation of the excitation coils 6, 7, 8 and thus improves the working efficiency when motors are manufactured.

(2) The excitation coils 6, 7, 8 have the first coil portions 6a, 7a, 8a, which helically extend from the first end (proximal end) to the second end (distal end) of the stator, and the second coil portions 6b, 7b, 8b, which extend helically from the second end to the first end, while being wound in a direction opposite to the winding direction of the first coil portions 6a, 7a, 8a. The permanent magnets 15, 16 are attached to the rotor 11 such that the poles of the permanent magnets 15, 16 each correspond to one of the coil portions 6a to 8a, and 6b to 8b. Thus, each of the coils 6, 7, 8, which face the poles of the permanent magnets 15, 16, can be formed by a single wire 10. This further improves the working efficiency of the manufacture of motors.

The above embodiment of the present invention may be modified as follows.

Figure 5:
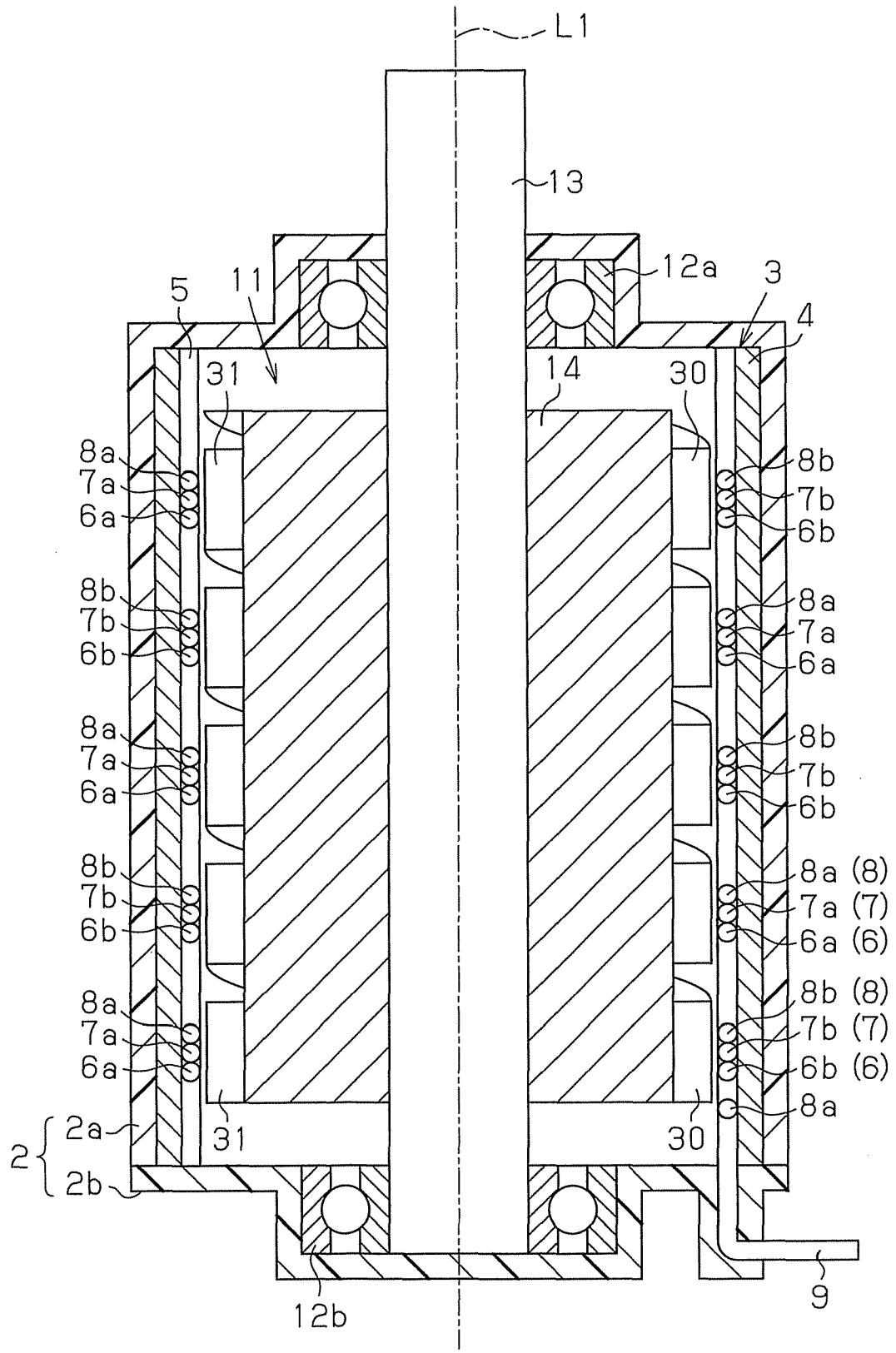
FIG. 5 is a cross-sectional view illustrating an electric motor according to a modified embodiment.

The motor of the above illustrated embodiment has the permanent magnets 15, 16. However, the present invention may be applied to a reluctance motor having a first protrusion 30 and a second protrusion 31, which have double-helical structure and serve as salient poles as shown in FIG. 5. The first and second protrusions 30, 31 extend helically about the axis L1. FIG. 5 shows a state groups of the first coil portions 6a to 8a and the second coil portions 6b to 8b are each densely arranged. For example, the first coil portions 6a to 8a correspond to the first protrusion 30, while the second coil portions 6b to 8b correspond to the second protrusion 31.

Figure 6:
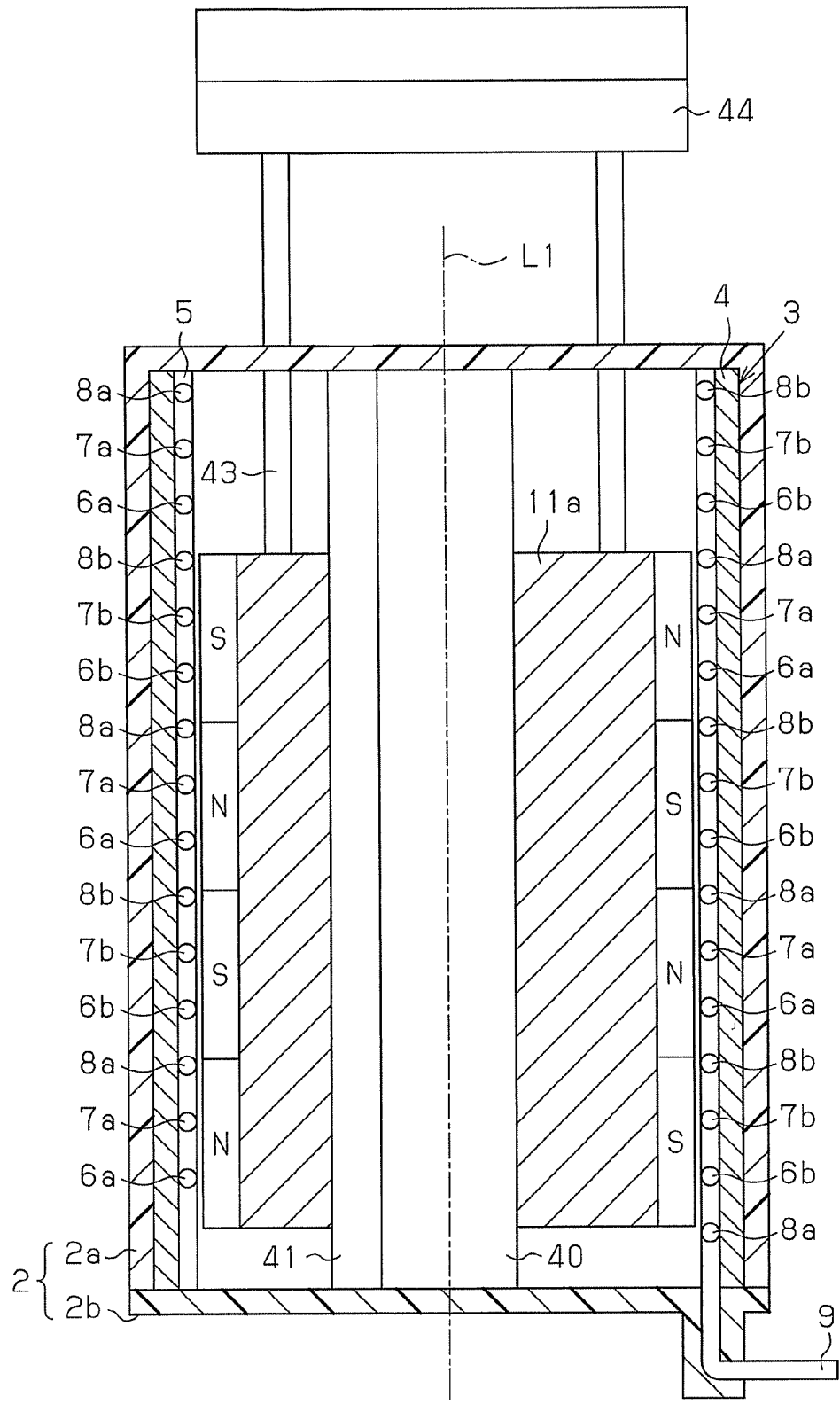
FIG. 6 is a cross-sectional view illustrating an electric motor according to another modified embodiment.

In the above illustrated embodiment, the bearings 12a, 12b allow the rotor 11 to rotate while restricting the radial and axial movements of the rotor 11, which is a mover. The present invention is not limited to this. For example, without restricting the axial and circumferential movements of the mover, the mover may be allowed to move both in the axial direction and the circumferential direction. Alternatively, the mover may be allowed to move in the axial direction while the movements of the mover in the radial and circumferential directions are restricted. For example, FIG. 6 shows one example of a structure permitting the mover to move in the axial direction. In this example, an electric motor has a stator 3 having the same structure as that of the illustrated embodiment, and a slider 11a, which serves as a mover. The slider 11a includes a sliding yoke 14a and permanent magnets 15, 16, which are attached to the outer circumferential surface of the sliding yoke 14a. The permanent magnets 15, 16 have the same structure as those in the above illustrated embodiment. The sliding yoke 14a is supported by a fixed shaft 40 in the housing 2 so as to reciprocate in the direction of the axis L1. The fixed shaft 40 has a sliding key 41, which prevents the sliding yoke 14a from rotating about the axis L1, while allowing the sliding yoke 14a to reciprocate along the axis L1. The sliding yoke 14a is coupled to an external pressing member 44 by rods 43. Magnetic field that is generated by supplying currents to the excitation coils 6, 7, 8 and the magnetic field of the permanent magnets 15, 16 produce in the slider 11a torque that is perpendicular to the inclination angle of the permanent magnets 15, 6. The torque linearly moves the sliding yoke 14a along the axis L1, so that the pressing member 44 move along the axis L1.

In the above describe embodiment, the present invention is applied to an inner rotor type electric motor in which the rotor 11 rotates inside the stator 3. However, the present invention may be applied to an outer rotor type electric motor.

In the above described embodiments, the present invention is applied to the brushless motor 1. However, the present invention may be other types of electric motors such as an alternate current motor.

What is claimed is:

1. An electric motor comprising:
   a cylindrical stator having excitation coils of three phases; and
   a mover that is movable relative to the stator, wherein, when electric currents are supplied to the excitation coils, the mover moves relative to the stator,
   wherein the mover has an opposed surface facing the excitation coils, the opposed surface being provided with a field pole or a protrusion that helically extends about an axis of the mover,
   wherein each excitation coil extends helically in the same direction as the field pole or the protrusion about the axis of the mover so as to face the field pole or the protrusion,
   wherein each excitation coil is formed by a continuous single wire and includes a first coil portion, a second coil portion, and a folded-back portion, the first coil portion helically extending from a first end to a second end of the mover in the axial direction, the second coil portion helically extending from the second end to the first end in the same direction as that of the first coil portion, the folded-back portion being connected between the first coil portion and the second coil portion, and
   wherein the field pole has a north pole and a south pole, and is configured such that, when the first coil portion corresponds to the north pole, the second coil portion corresponds to the south pole.

2. The electric motor according to claim 1, wherein each excitation coil includes a first coil portion and a second coil portion, the first coil portion helically extends from a first end to a second end of the mover in the axial direction, the second coil portion helically extending from the second end to the first end in the same direction as that of the first coil portion, and
   wherein the protrusion is one of a first and second protrusions, which are configured such that, when the first coil portion corresponds to the first protrusion during the operation of the motor, the second coil portion corresponds to the second protrusion.

3. The electric motor according to claim 1, wherein the mover is arranged to be rotatable relative to the stator.

4. The electric motor according to claim 3, wherein the mover is arranged to be rotatable in a position radially inside of the stator.

5. The electric motor according to claim 3, further comprising a position detecting sensor for detecting the position of the mover, wherein the drive currents supplied to the excitation coils are generated based on a signal from the position detecting sensor.

* * * * *